United States Patent [19]
Heese

[11] 3,823,758
[45] July 16, 1974

[54] ACTUATOR ASSEMBLY
[75] Inventor: William E. Heese, Akron, Ohio
[73] Assignee: Allen Electric and Equipment Company, Orrville, Ohio
[22] Filed: Dec. 3, 1970
[21] Appl. No.: 94,802

[52] U.S. Cl............................ 160/188, 60/6, 92/17
[51] Int. Cl............................................. E05f 15/04
[58] Field of Search......... 160/188; 60/6; 91/41, 44, 91/45; 92/2, 17, 27, 28, 33, 134

[56] References Cited
UNITED STATES PATENTS

| | | | |
|---|---|---|---|
| 2,099,368 | 11/1937 | Leuy.................................... | 92/134 |
| 2,770,297 | 11/1956 | Mercier et al. ..................... | 160/188 |
| 2,918,786 | 12/1959 | Geyer................................... | 60/6 |
| 3,026,850 | 3/1962 | Clifton et al............................ | 60/6 |
| 3,255,806 | 6/1966 | Meyer et al............................. | 92/33 |
| 3,310,913 | 3/1967 | Richter................................ | 160/188 |

Primary Examiner—Peter M. Caun
Attorney, Agent, or Firm—Watts, Hoffmann, Fisher & Heinke, Co.

[57] ABSTRACT

A power operated hatch cover assembly including a pair of hatch covers hinged together and actuating assemblies for moving the hatch covers between closed and open positions. Each actuating assembly includes a pair of actuators which are simultaneously operated to produce a varying actuating force with the total force being greater than the force required to open the hatch cover assembly. One actuator operates on stored energy derived from closing the hatch and in case of power failure prevents the hatch cover assembly from rapidly falling closed.

14 Claims, 5 Drawing Figures

FIG. 3

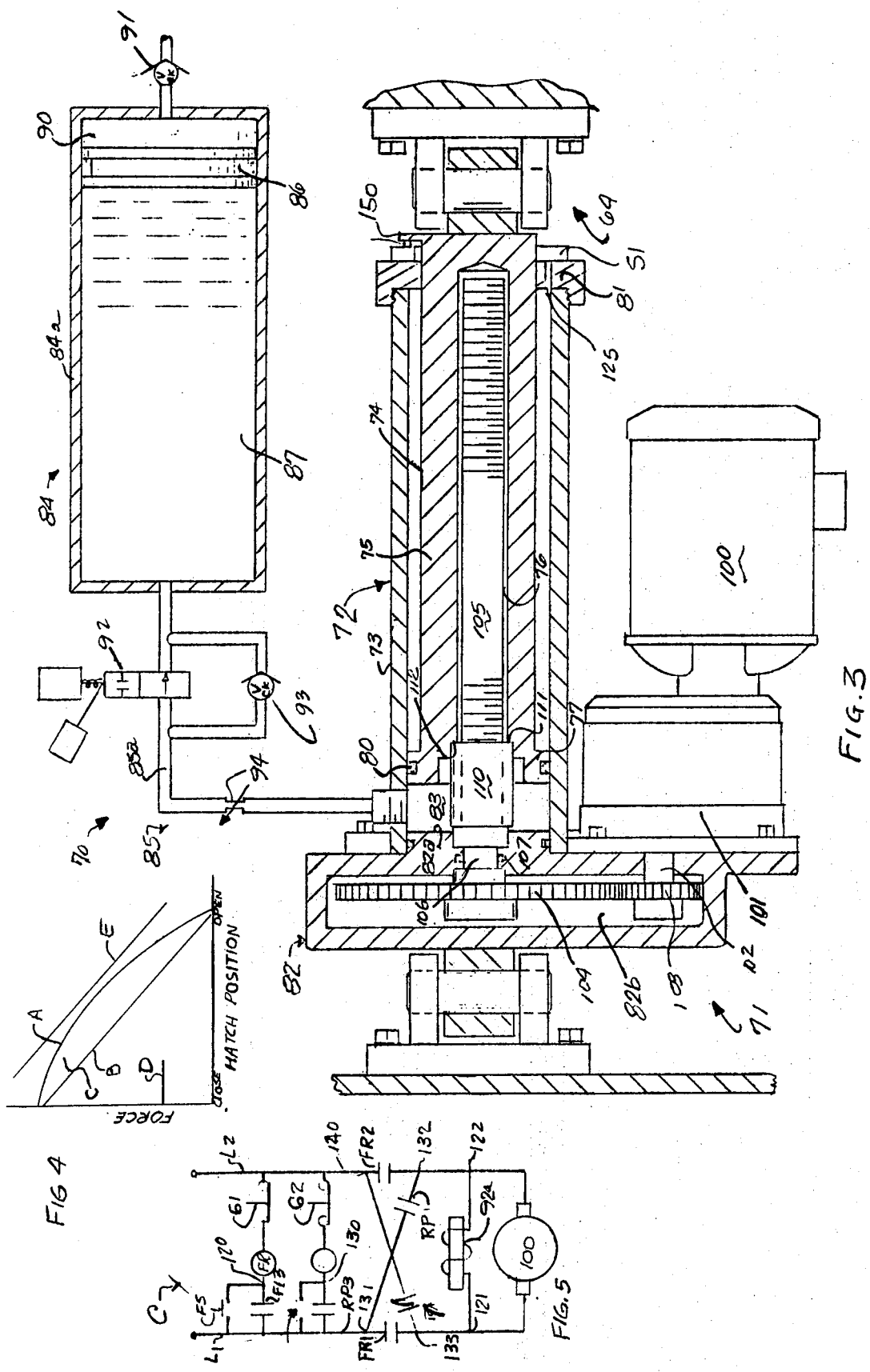

ACTUATOR ASSEMBLY

BACKGROUND OF THE INVENTION

1. Field of the Invention

The present invention relates to actuator assemblies and more particularly relates to actuator assemblies which operate to provide a varying actuating force to change the position of an actuated member which is normally urged to a particular position by a varying force.

Covers for hatchways, or the like, normally found on a ship are conventionally constructed from a pair of hatch covers which extend across the hatchway. Generally one of the hatch covers is connected to the deck of the ship by a hinge or pivot construction so that the cover is rotatable about the point of connection to the ship. The hatch covers are hinged together at their adjacent sides. The covers are thus rotatable with respect to each other about the axis of the hinge as the first mentioned cover is rotated about its connection to the ship.

The second cover can be supported on tracks extending along sides of the hatchway so that the second cover is freely movable across the hatch as the cover assembly is opened. When the hatch cover assembly is in a closed position, the cover members extend horizontally across the hatchway and the upwardly facing sides of the cover members form a substantially unbroken surface.

When the hatch cover is opened, the first mentioned hatch cover is rotated about its connection to the ship resulting in the covers rotating with respect to each other about their hinged connection. When the hatch cover is opened, the covers extend in a generally vertical direction at one side of the hatchway and substantially parallel to each other.

Hatch covers for ships must be structurally strong, resistant to corrosion from the elements, and be relatively unaffected by heat in the event fire should break out in the hold of the ship. As a result of these requirements, hatch covers are generally constructed of metal, such as steel plates, and are relatively heavy.

Due to the mass of such hatch covers, it is necessary to open the covers by the use of suitable power operated machinery. In the past, winches, etc. have been utilized for this purpose and more recently actuators associated with the hatch covers themselves have been used.

Because of the construction and orientation of hatch cover assemblies of the type referred to, the force of gravity acting on the hatch cover assembly tends to maintain the assembly in its closed position. The force of gravity resisting opening of the hatch cover continually decreases as the cover approaches its open position. Accordingly, actuators for opening the hatch covers must be capable of applying an opening force upon the cover which is greater than the maximum force of gravity resisting opening of the hatch.

2. The Prior Art

The prior art has utilized electrically driven screw jacks and the like for opening hatch cover assemblies. In many such proposals, the hatch cover has been subject to falling closed under the action of gravity in the event of an electric power failure. Accordingly, it has been proposed that such hatch cover constructions be provided with back-up apparatus to prevent such an occurrence. The back-up apparatus in some of the proposals has consisted of a piston-cylinder actuator operated in series with the jacks. Other proposals have suggested the use of piston-cylinder actuators for opening and closing the hatch.

As is previously pointed out, the force required to open the hatch cover assembly against the action of gravity is relatively large when the hatch cover is in a completely closed position. The gravity force decreases as the hatch cover moves toward its open position. For this reason, the actuators utilized to operate the hatch covers have necessarily been constructed to produce actuating forces sufficient to initially open the hatch covers.

In the case of electrically operated hatch covers, the requirement of a large initial actuating force has resulted in the use of relatively large electric motors and associated apparatus. When piston-cylinder type actuators are utilized, such arrangements must also be capable of providing a large initial actuating force.

As a result of these actuating force requirements, the prior art proposals have used a relatively large and heavy actuating apparatus for the hatch covers. The requirement for back-up equipment has, in some proposals, resulted in additional weight and size of the actuating equipment.

SUMMARY OF THE INVENTION

The present invention provides actuating assemblies which produce varying actuating forces. When used in conjunction with a hatch cover or similar construction, actuating assemblies according to the present invention provide a large initial opening force applied to the hatch cover. This force is reduced as the hatch cover approaches its open position.

In a preferred construction, a hatchway is closed by a cover assembly including two covers. One cover is hinged to the deck of a ship adjacent the hatchway and the other cover rolls along tracks at the sides of the hatchway. The covers are hinged together at their adjacent sides and an actuating assembly is associated with each cover. The actuating assemblies work in conjunction with each other to open and close the hatch covers.

Each of the actuating assemblies of the present invention includes a pair of actuators. One actuator applies a substantially constant force to the hatch cover which is substantially less than the force required to initially open the cover. The other actuator utilizes stored energy from closing of the hatch cover to apply an actuating force which is initially large but which decreases as the hatch cover approaches its open position.

When both of the actuators of each actuating assembly operate together, the total actuating force applied to the hatch cover is sufficiently large to initially open the cover. This total force decreases as the hatch cover is moved open. The total force is of larger magnitude than the magnitude of the force of gravity resisting opening at all times during opening.

In view of the relatively small forces applied by the individual actuators, each actuator is relatively small in comparison with prior art devices of the same general type. The new actuating assembly additionally eliminates the need for separate back-up systems as referred to previously. The variable force actuator, by virtue of absorbing energy from closing of the hatch cover, serves as a safety device which retards rapid falling shut of the hatch cover.

Accordingly, a principal object of the present invention is the provision of a new and improved actuating assembly capable of applying a variable actuating force to a member for moving the member between first and second positions.

Another object of this invention is to provide a new and improved actuating assembly for applying a varying force to a load of varying magnitude by the partial use of stored energy and thereby diminishing the power required by the assembly.

Other objects and advantages of the present invention will become apparent from a consideration of the following detailed description made with reference to the accompanying drawings which form a part of the specification.

BRIEF DESCRIPTION OF THE DRAWINGS

FIG. 3 is a fragmentary cross sectional view of a portion of the assembly shown in FIG. 1 having parts illustrated schematically;

FIG. 4 is a graphic representation of the relationship between actuating forces and hatch position; and, FIG. 5 is a schematic control system for the hatch cover assembly.

DESCRIPTION OF THE PREFERRED EMBODIMENT

Figure 1:
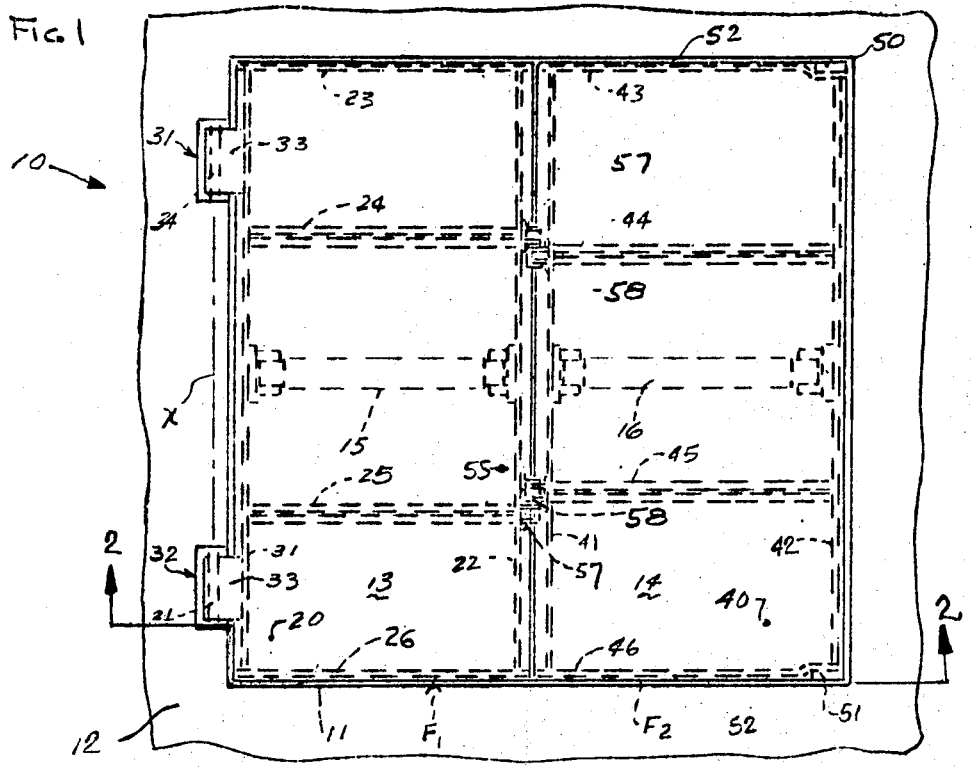
FIG. 1 is a top plan view of a power operated hatch cover assembly embodying the present invention and having portions illustrated schematically.
Figure 2:
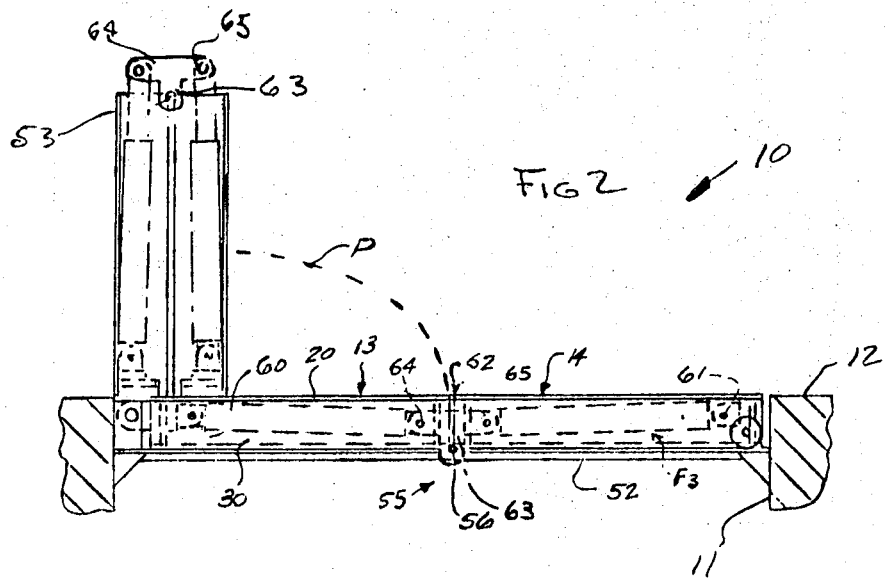
FIG. 2 is a view of the assembly of FIG. 1 seen from the plane indicated by the line 2—2 of FIG. 1.

FIGS. 1 and 2 illustrate a power operated hatch cover assembly 10. The assembly 10 is positioned in a hatchway 11 defined in a deck 12 of a ship. The assembly 10 includes first and second hatch cover members 13, 14 which are movable relative to the deck 12 and to each other between a position where the hatchway 11 is closed as shown in FIG. 1 and positions where the hatchway is open (as seen in broken lines in FIG. 2). The cover members 13, 14 are movable between their open and closed positions by operation of actuating assemblies 15, 16 associated with the cover members 13, 14, respectively. The actuating assemblies 15, 16 are illustrated schematically in FIGS. 1 and 2.

THE HATCH COVERS

The cover member 13 includes a plate-like body 20 supported by a frame structure F1 including longitudinally extending structural members 21, 22 adjacent opposite sides of the plate 20 and laterals 23–26 extending transversely of the structural members 21, 22. The laterals 23–26 are suitably connected to the structural members 21, 22 at spaced locations along the members 21, 22 such as by welding. The laterals 23–26 include surfaces 30 extending downwardly from the plate 20 to form side walls at opposite ends of the plate.

The cover 13 is connected to the deck 12 by hinges 31, 32. The hinges 31, 32 each include a knuckle 33 connected to the plate of the cover 13 which is rotatable about a pintle 34 connected to the deck 12. The pintles 34 are axially aligned so that the cover 13 is rotatable relative to the deck 12 about the axis X.

The cover 14 is constructed from a plate 40 and a frame construction F2 including longitudinally extending structural members 41, 42 at opposite sides of the plate 40 and transversely extending lateral frame members 43–46.

The laterals 43, 46 carry rotatable wheels 50, 51 adjacent the junctures of the members 43, 42 and 46, 42, respectively. The wheels 50, 51 ride on tracks 52, which extend across the hatchway 11 adjacent its ends.

The covers 13, 14 are connected at their adjacent sides by a hinge 55. The hinge 55 includes a cylindrical hinge pin 56 which extends parallel to the sides of the covers 13, 14. The hinge pin 56 is engaged by knuckles 57, 58, connected to the frames F1, F2, respectively. The knuckles 57, 58 are loosely disposed about the pin 56 so that the covers 13, 14 are rotatable with respect to each other about the axis of the pin 56.

THE ACTUATOR ASSEMBLIES

The actuating assemblies 15, 16 are operated to rotate the cover 13 about the hinge structures 31, 32 while rotating the covers 13, 14 relative to each other about the hinge structure 55. In this manner, the hatch cover assembly 10 is moved from its closed position to its open position. During the opening movement, it is apparent that the wheels 50, 51 on the cover 14 provide for low friction movement of the cover 14 along the tracks 52.

The actuating assemblies include clevises 60, 61 at opposite ends which are fixed to the structural members 21, 42, respectively. Adjacent ends of the actuating assemblies 15, 16 are rotatably connected to a linkage 62. The linkage 62 includes a leg 63 having an opening which receives the pin 56. The linkage 62 additionally includes legs 64, 65 which define clevis connections to the actuators 15, 16.

The actuating assemblies 15, 16 are illustrated schematically in FIGS. 1 and 2 and are described in greater detail presently; however, suffice it to say that each assembly is extensible to provide oppositely directed forces along a line between each clevis connection at the link 62 and the clevis constructions 60, 61. When the covers are opened, the force exerted on the clevis 60, is of sufficiently large magnitude to cause the cover 13 to pivot about the axis X toward its open position. The cover 14 pivots about the locations of engagement between the wheels 50, 51 and track 52 as a result of the actuating force exerted by the apparatus 16 upon the clevis 61.

Movement of the covers 13, 14 in the manner described results in relative rotation between the covers 13, 14 about the hinge 55. When the covers have rotated relative to each other through a relatively small angle, the actuating force applied to the legs or clevises 64, 65 of the link 62 urges the link upwardly to continue movement of the covers toward the open position.

The path of travel P of the center of gravity of the hatch cover assembly 10 is illustrated in broken lines in FIG. 2. During the initial movement of the hatch cover assembly 10 from its closed position, the center of gravity of the assembly is moved substantially vertically and only a relatively small distance horizontally. As the assembly 10 approaches its open position, the movement of the center of gravity of the assembly is substantially horizontal with only a small amount of vertical movement of the center of gravity.

From inspection of the path P, it is apparent that greater actuating forces are required during the initial stages of opening of the hatch cover than during the terminal stages of opening the cover. Accordingly, the maximum actuating force is required when the cover is initially moved toward the open position since the mass of the assembly is moved nearly vertically. When the assembly approaches its open position, relatively small actuating forces are required to continue opening movement.

The actuating assemblies 15, 16 exert large actuating forces during the initial stages of opening the hatch cover and relatively smaller actuating forces as the cover nears its open position. Thus, the total power requirements of these assemblies need not be as great as the power requirements of previously known actuators utilized for the same purpose.

The actuating assemblies 15, 16 are identical in construction and accordingly only the assembly 15 is illustrated and described in detail (FIG. 3). The assembly 15 includes a hydraulic actuating system 70 and an electro-mechanical actuating system 71. The hydraulic system 70 produces a variable actuating force derived from energy stored during closure of the hatch covers and the electro-mechanical system produces a constant actuating force. These actuating forces are compounded during opening of the hatch covers.

The Hydraulic System

The hydraulic system 70 comprises a piston-cylinder actuator 72 including a cylinder 73 and a piston 74 disposed within the cylinder 73 and fixed to the clevis 64. The piston 74 includes a cylindrical body 75 having an axially extending bore 76 opening at the left end of the piston 74 (as viewed in FIG. 3). The piston additionally includes a skirt 77 at its left end which engages the bore of the cylinder 73 and preferably carries a suitable sealing ring 80. The right end of the piston 74 is surrounded by a bushing 81 which maintains movement of the piston 74 along the axis of the cylinder 73. The piston 74, cylinder 73, and a wall 82a of a housing 82 define a pressure chamber 83 within the cylinder 73 at the left of the piston 74. The chamber 83 communicates with an accumulator 84 through the fluid control network generally indicated at 85.

The accumulator 84 includes a cylinder 84a and a free piston 86 within the cylinder 84a which defines chambers 87, 90 in the cylinder. The chamber 90 is communicable with atmospheric air through a check valve 91 which permits atmospheric air to flow into the chamber 90 but prevents loss of air to the atmosphere from the chamber 90. The chamber 87, the network 85, and the chamber 83 contain a suitable hydraulic fluid. This fluid is communicated between the chamber 83 and the accumulator through the network 85.

The network 85 includes a conduit 85a and a normally closed solenoid valve 92 in the conduit. A check valve 93 is connected in parallel around the valve 92. The check valve 93 permits fluid to flow from the chamber 83 to the chamber 87 but prevents flow from the chamber 87 to the chamber 83. A variable flow restrictor 94 (schematically shown) is connected between the chamber 83 and valves 92, 93 so that the flow rate of hydraulic fluid in the network 85 is suitably throttled.

The piston 74 is movable from its illustrated position toward the right as seen in FIG. 3 to effect opening movement of the hatch covers. When the covers are in the open position, the chamber 83 is relatively large and contains a substantial proportion of the hydraulic fluid. Similarly, the chamber 87 in the accumulator 84 is relatively small owing to the removal of hydraulic fluid from that chamber and movement of the free piston 86 toward the left as viewed in FIG. 3.

The actuator 72 provides an actuating force for opening the hatch cover produced from the energy which is stored by the accumulator during closing of the hatch. When the hatch is moved from its open to its closed position, the piston 74 is moved from its fully extended position to its position illustrated in FIG. 3. As this movement occurs, hydraulic fluid in the chamber 83 is forced from the chamber through the flow restrictor 94 and the open valve 92 into the accumulator chamber 87. The hydraulic fluid flow into the chamber 87 urges the free piston 86 toward the right, as viewed in FIG. 3, to compress the air in the chamber 90. The check valve 91 prevents the air in the chamber 90 from exhausting to atmosphere. Energy made available by the movement of the hatch covers to their closed positions is stored in the form of compressed air in the chamber 90. The compressed air acts to force the piston 86 towards the left, as viewed in FIG. 3, when the hatch covers are opened.

When the piston 74 is fully retracted, i.e. it is positioned as illustrated in FIG. 3, the air pressure in the chamber 90 is relatively high. That pressure is transmitted to the hydraulic fluid in the chamber 87 and through and network 85 to the chamber 83. Accordingly, when the hatch cover is closed a substantial fluid pressure force is exerted against the piston 74 of each actuator assembly 15, 16. These forces tend to actuate the cover toward the open position. Because of friction losses, etc. the actuating forces are slightly less than the force required to open the hatch cover so that the hatch cover remains firmly closed.

When the hatch cover assembly is opened, the piston 74 is moved toward the right (FIG. 3) by hydraulic fluid which is forced from the chamber 87. The air pressure in the chamber 90 is reduced as the piston moves and hence the hydraulic actuating force provided by the piston is reduced as the piston moves.

The Electromechanical Actuator

The electromechanical system 71 utilizes an electrically powered screw jack mechanism to apply a constant actuating force to the piston 74 in addition to the fluid pressure force acting on the piston. The system 71 includes a reversible electric motor 100 and speed reducer 101 which are connected to the housing 82. The speed reducer 101 has an output shaft 102 which extends into a gear chamber 82b in the housing 82. A pinion gear 103 in the chamber 82b is fixed to the shaft 102. The pinion gear 103 meshes with a driven gear 104 which is drivingly connected to a ball screw 105. The ball screw 105 includes a shaft 106 which extends through the wall 82a of the housing 82 from the gear chamber 82b to the chamber 83. The wall 82a of the housing 82 defines a groove which surrounds the shaft 106 and a suitable seal 107 is disposed in the groove to prevent leakage of high pressure fluid from the chamber 83 along the shaft 106 to the gear chamber.

A sleeve-like ball nut 110 is disposed on the screw 105. The ball nut 110 includes an annular surface 111 which is telescopically received in the piston 74 and abuts a shoulder 112 formed near the open end of the bore 76. The ball nut 110 is internally threaded and carries a plurality of balls which are disposed between the threads of the ball nut and the threads of the ball screw 105. As the screw 105 is rotated, the ball nut is advanced along the screw with a minimal amount of frictional resistance.

The motor 100 is relatively small and drives the screw jack to provide an actuating force which is relatively constant. When the motors 100 of both actuator assemblies 15, 16 are operated, the total force is substantially less than the force required to initially lift the hatch cover assembly.

When the motors 100 are operated in a direction to open the hatch covers, each screw 105 is driven causing the associated ball-nut to advance along its screw 105 toward the right as viewed in FIG. 3. Movement of the ball-nut 110 urges the piston 74 toward the right. The total force exerted by the hydraulic fluid in the chamber 83 against the piston 74 and by the ball-nut 110 against the piston 74 is greater than the force required from each actuator assembly to open the hatch cover assembly. Accordingly, the hatch cover assembly is moved from its closed position toward its open position as the piston 74 moves toward the right.

The motor 100 of each actuator assembly is energized through suitable electrical control circuitry. The control circuitry is preferably constructed so that the solenoid valve 92 is energized and opened whenever the motor 100 is energized. Fluid pressure in the chamber 87 is thus bypassed around the check valve 93 and communicated to the chamber 83 through the opened valve 92.

The force applied to the piston 74 by the electromechanical system is substantially constant throughout the travel of the piston and this force is of sufficient magnitude to complete opening movement of the hatch cover when piston movement has reduced the fluid pressure in the chamber 83 to a relatively low level.

The flow restrictor 94 governs the rate at which the hatch cover assembly is opened and closed by throttling the flow of hydraulic fluid to and from the chamber 83.

FIG. 4 illustrates the relationship between the various forces involved in opening and closing a hatch cover, as related to hatch cover position. The line A in FIG. 4 represents the force required to open the hatch cover assembly against the force of gravity. The line B illustrates the total force applied by the hydraulic systems 70 of the actuator assemblies 15, 16 at any time during movement of the hatch cover. The line D illustrates the force applied by the electro-mechanical systems 71 of the actuators 15, 16 at any time during movement of the hatch cover. The line E illustrates the total hatch cover actuating force applied by the actuator assemblies 15, 16 during movement of the hatch cover assembly.

An example of electrical control circuitry which might be used in connection with the actuator assemblies is shown in FIG. 5. The control circuit C includes the lines L1, L2 connected across a suitable electric power supply (not shown). The solenoid 92a of the valve 92 and the motor 100 are connected between the lines L1, L2. Energization of the motor 100 and solenoid 92a is effected by energization of either a forward control relay FR or a reverse control relay RR.

When the electromechanical system 71 is energized to actuate the hatch covers to the open position, a manual forward switch FS is momentarily closed to establish an energizing circuit for the relay FR from the line L1 through the contacts of the switch FS, a junction 120, the forward relay FR, and closed contacts of a limit switch S1 to the line L2.

The forward control relay FR includes normally open contacts FR1-3 which are closed in response to energization of the forward control relay. The contacts FR3 are closed to establish a holding circuit for the relay FR. The holding circuit is established from the line L1 through the relay contacts FR3, the junction 120, the relay FR, the limit switch S1 to the line L2. Thus, the relay FR is maintained energized after the contacts of the starting switch FS are opened.

Closing of the contacts FR1, FR2 establish energizing circuits through the solenoid 92a and the motor 100. The solenoid is energized through the contacts FR1, a junction 121 at the line L1, through the solenoid, a junction 122, and to the line L2 through the contacts FR2. The motor 100 is energized through the contacts FR1, FR2.

The forward relay FR remains energized until the piston 74 is in its fully extended position at which time the piston skirt 77 engages an actuating rod 125 of the limit switch S1 (FIG. 3). The switch S1 is mounted on the bushing 81 with the rod 125 extending through the bushing for engagement with the skirt 77. When the skirt 77 engages the rod, the switch S1 is opened, deenergizing the forward control relay FR. The contacts FR1-3 immediately open to deenergize the solenoid 92a and the motor 100.

Deenergization of the solenoid 92a closes the valve 92 and prevents flow of hydraulic fluid from the chamber 83 to the accumulator 84. It should be noted that the check valve 93 also prevents flow from the chamber 83 to the accumulator 84. Thus, when the piston 74 is in its fully extended position, hydraulic fluid is prevented from flowing from the cylinder 73. Due to the substantially incompressible nature of the hydraulic fluid, the hatch cover is locked in its open position and cannot fall shut even if an electrical power failure should occur.

When it is desired to close the hatch cover, the manual reverse switch RS is momentarily closed. Closing the switch RS establishes an energization circuit for the reverse control relay RR, from the line L1 through the contacts of the switch RS, a junction 130, the reverse relay RR, contacts of the limit switch S2, and to the line L2.

The reverse relay RR includes normally open contacts RR1-3, which close in response to energization of the reverse control relay. When the contacts RR3 are closed, a holding circuit is established through the reverse control relay. The holding circuit is traced from the line L1 through the closed contacts RR3, the junction 130, the relay RR, limit switch S2, and to the line L2. The contacts RR3 thus maintain the relay RR energized after the reverse switch RS is opened.

The contacts RR1, RR2 of the relay RR are closed to provide an energization circuit for the solenoid 92a and the motor 100 from the line L1 through the junction 131, the closed contacts RR1, a junction 132, junction 122, the solenoid 92a, junction 121, a junction 133, contacts RR2, and a junction 140 at the line L2. The motor 100 is connected in parallel with the solenoid 92a and both are energized through the contacts RR1, RR2.

Thus, when the motor 100 is operated in the reverse direction, the solenoid 92a is energized to open to valve 92 and permit flow of hydraulic fluid from the chamber 83 to the accumulator 84 as the piston 74 is retracted.

When the piston 74 is fully retracted, an arm 150 (FIG. 3) at the end of the piston 74 engages an actuating rod 151 of the limit switch S2, causing the limit switch S2 to open. Opening the limit switch S2 deenergizes the reverse control relay RR, opening the contacts RR1-3 and deenergizing the motor 100 and the solenoid 92a.

It should be appreciated that the flow restrictor 94 governs the rate at which hatch covers are closed by governing the flow rate of hydraulic fluid from the chamber 83 to the accumulator 84. It should be further appreciated that, in the event of an electric power failure, the solenoid 92a is deenergized to close the valve 92. Hence the hydraulic fluid is trapped in the cylinder 73 and prevents further retracting movement of the piston 74 and falling shut of the hatch cover which might otherwise occur.

In the event that a hatch cover is maintained closed for a relatively long period of time, it is possible that leakage of pressurized air from the chamber 90 may occur. Such leakage can reduce the hydraulic pressure in the chamber to a sufficiently low level that the total actuating force provided by the hydraulic and electromechanical systems is not sufficient to open the hatch cover assembly.

In such an event, the covers 13, 14 can be connected to the ship's winch and winched to their open position. Winching the covers to their open position results in a flow of hydraulic fluid from the accumulator to the chamber 83 through the check valve 93 and restrictor 94. This flow of the hydraulic fluid tends to move the piston 86 to the left as viewed in FIG. 3, and when the pressure in the chamber 90 is reduced below atmospheric pressure, the check valve 91 opens to admit atmospheric air into the chamber 90. In this manner, the accumulator is recharged with air. After the hatch cover has been reclosed, the actuator 15 is again capable of controlling operation of the hatch covers without the necessity of auxiliary apparatus such as a winch.

Although the invention has been described in its preferred form with a certain degree of particularity, it is understood that the present disclosure of the preferred form has been made only by way of example and that numerous changes in the details of construction and the arrangement of parts may be resorted to without departing from the spirit and the scope of the invention as hereinafter claimed.

What is claimed is:

1. Apparatus for actuating a structure which is biased toward a first position and which resists movement from the first to a second position by a varying force comprising:
   a. a first actuator for applying a first substantially constant actuating force to said structure for urging the structure toward the second position, said actuating force being less than the force required to actuate said structure from one position;
   b. a second actuator for applying a second actuating force to said structure for urging said structure toward the second position, siad second force varying according to the position of said structure, said second actuating force being less than the force required to actuate said structure from said first position;
   c. energy storing means associated with said second actuator for storing energy as said structure moves from said second toward said first position and to supply stored energy to said second actuator for moving said structure toward said second position; and,
   d. means connecting said actuators to said structure at a common location so that said first and second actuating forces are applied to said structure simultaneously at said location and along a common line of action to actuate said structure from said first position by a varying actuating force greater than the biasing force resisting movement of said structure.

2. Apparatus as defined in claim 1 and further including means associated with said energy storing means and said second actuator for preventing movement of said structure toward said first position when said first actuator is not operating.

3. Apparatus as defined in claim 1 wherein said second actuator comprises a hydraulically actuated member and said energy storing means comprises an accumulator communicable with said actuated member through a fluid circuit.

4. Apparatus as defined in claim 3 wherein said fluid circuit includes valve means for preventing fluid flow from said actuated member to said accumulator when said first actuator is not operating.

5. Apparatus as defined in claim 4 wherein said valve means comprises a first valve openable to permit fluid flow therethrough between said accumulator and said actuated member, and means for opening said first valve when said first actuator is operative.

6. Apparatus as defined in claim 3 wherein said fluid circuit comprises a flow restrictor for throttling the flow of fluid in said fluid circuit to control the rate of movement of said actuated member.

7. Apparatus as defined in claim 3 wherein said first actuator comprises motor means and drive means for connecting said motor means to said actuated member.

8. Apparatus as defined in claim 7 wherein said drive means comprises a screw member cooperating with a screw thread connected to said actuated member and balls disposed between said screw member and said screw thread, said motor effecting relative rotation between said screw member and said screw thread to apply said first force to said actuated member.

9. A cover assembly for a hatchway comprising:
   a. first cover member pivotable about a first axis;
   b. a second cover member pivotally connected to said first cover member and rotatable with respect to said first cover member as said first cover member is rotated about said first axis;
   c. said first and second cover members cooperating to provide a closed hatchway position wherein said cover members lie substantially in a common plane extending across the hatchway and an open hatchway position wherein said cover members extend generally parallel to each other along a side of the hatchway in a direction transverse to said plane;
   d. said cover members having a composite center of gravity which moves in a vertical plane along an arcuate path which extends primarily vertically when said cover members are in the vicinity of their closed hatchway position and which moves in a generally horizontal direction when said cover members are in the vicinity of their open hatchway position, e. actuator means for actuating said first and second cover members between said open and closed hatchway positions; and, f. said actuator means comprising at least one variable force fluid actuator for applying a variable actuating force to said cover members for moving said cover members toward said open hatchway position and a second actuator acting in concert with said variable force actuator, said variable force fluid actuator applying a greater force to said cover members in the vicinity of said closed hatchway position than when said cover members are in the vicinity of said open hatchway position, said fluid actuator including a fluid energy storage means comprising a fluid pressure accumulator for storing energy resulting from said cover members being moved to the closed hatchway position and for applying the stored fluid energy to the cover members while the cover members are actuated to their open hatchway position.

10. A cover assembly as defined in claim 9 further including a linkage connecting said cover members together, said linkage including parts connected to said first and second actuators.

11. A cover assembly as defined in claim 10 wherein said second actuator is a constant force actuator for applying a substantially constant actuating force to said cover members.

12. A cover assembly as defined in claim 11 wherein the individual actuating forces of said variable force actuator and said constant force actuator are less than the force necessary to actuate said cover members from said closed hatchway position.

13. A cover assembly as defined in claim 10 wherein said second actuator is electrically powered and further including means associated with said first actuator for conditioning said first actuator to prevent closing of said cover assembly when the supply of electrical power to said second actuator is interrupted.

14. In a system for opening and closing a hatchway:

a. a hatch cover assembly comprising:
  i. a first cover member pivotable about an axis extending along a boundary of the hatchway;
  ii. a second cover member pivotally connected to said first cover member and rotatable with respect to said first cover member when said first cover member is pivoted about said axis;
  iii. said first and second cover members cooperating to provide a closed hatchway position wherein said cover members lie substantially in a common plane extending across the hatchway and an open hatchway position wherein said cover members extend generally parallel to each other along the boundary of the hatchway in a direction transverse to said plane;
  iv. said first and second cover members having a composite center of gravity which moves along an arcuate path in a vertical plane as said cover members move between said open and closed hatchway positions, said center of gravity being elevated as said cover members move toward said open hatchway position, said center of gravity moving primarily in a vertical direction as said cover members are moved towards or away from said closed hatchway position and moving primarily in a horizontal direction as said cover members are moved towards or away from said open hatchway position; and, b. actuator means for effecting movement of said cover members between said positions comprising:

i. at least a first actuator for applying a first substantially constant actuating force to said hatch cover assembly for urging said cover members from said closed hatchway position toward said open hatchway position, said first actuating force having a magnitude which is insufficient to move said cover members away from said closed hatchway position but sufficiently great to move said cover members to said open hatchway position from a position intermediate said open and closed hatchway positions;

ii. at least a second fluid operated actuator for applying a second actuating force to said hatch cover assembly for urging said cover members toward said open hatchway position, said second actuating force decreasing in magnitude as said cover members move towards said open hatchway position from a maximum second actuating force applied to said cover assembly when said cover members are in the closed hatchway position, said maximum second actuating force being insufficient to move said cover members away from said closed hatchway position;

iii. said first and second actuators operable to simultaneously apply said first and second actuating forces to said cover members to enable said actuator means to produce a total actuating force sufficient to move said cover members from said closed hatchway position and to maintain a total actuating force applied to said cover members which is sufficient to continue movement of said cover members to said open hatchway position;

iv. said second actuator comprising fluid energy storage means including a fluid pressure accumulator which is effective to store energy in the form of fluid under pressure resulting from said composite center of gravity moving downwardly as said cover assembly moves to the closed hatchway position and to expend the stored fluid energy as said cover assembly is moved toward said open hatchway position.

* * * * *